US012633485B2

(12) United States Patent
Sudhaus et al.

(10) Patent No.: US 12,633,485 B2
(45) Date of Patent: May 19, 2026

(54) DEVICE AND METHOD FOR SAFETY SWITCH OFF OF AN ELECTRICAL CONSUMER IN A VEHICLE

(71) Applicant: ELMOS Semiconductor SE, Dortmund (DE)

(72) Inventors: Andre Sudhaus, Dortmund (DE); Fikret Abaza, Duisburg (DE); Peter Maurer, Velbert (DE)

(73) Assignee: ELMOS Semiconductor SE, Leverkusen (DE)

( * ) Notice: Subject to any disclaimer, the term of this patent is extended or adjusted under 35 U.S.C. 154(b) by 283 days.

(21) Appl. No.: 18/375,945

(22) Filed: Oct. 2, 2023

(65) Prior Publication Data

US 2024/0120166 A1 Apr. 11, 2024

(30) Foreign Application Priority Data

Oct. 5, 2022 (EP) ..................................... 22199853

(51) Int. Cl.
| | |
|---|---|
| *H01H 71/74* | (2006.01) |
| *H02H 3/087* | (2006.01) |
| *H02H 7/26* | (2006.01) |

(52) U.S. Cl.
CPC ............ *H01H 71/74* (2013.01); *H02H 3/087* (2013.01); *H02H 7/268* (2013.01); *H01H 2231/026* (2013.01)

(58) Field of Classification Search
CPC ........ H02H 7/268; H02H 3/087; H01H 71/74; H01H 2231/026
See application file for complete search history.

(56) References Cited

U.S. PATENT DOCUMENTS

| | | | |
|---|---|---|---|
| 11,404,866 B2 | 8/2022 | Illing et al. | |
| 2017/0294772 A1* | 10/2017 | Illing | H02H 9/025 |
| 2020/0266637 A1* | 8/2020 | Hinterberger | H01M 10/48 |
| 2022/0060011 A1* | 2/2022 | Yousef | H03K 5/24 |

FOREIGN PATENT DOCUMENTS

| | | |
|---|---|---|
| DE | 102015214523 A1 | 2/2017 |
| DE | 102019202163 A1 | 8/2020 |
| DE | 102019125122 A1 | 3/2021 |

* cited by examiner

*Primary Examiner* — Harry R Behm
(74) *Attorney, Agent, or Firm* — Mindful IP PLLC

(57) ABSTRACT

In a safety switch off of an electric consumer in a vehicle, the current consumption of the consumer is monitored in its active state by a main monitoring unit with respect to a safety switch off threshold which, when reached or exceeded, results in switching off the electronic switch. In a further operating state, in which the current consumption of the line leading to the consumer is lower than in its active state, the current consumption is monitored by an auxiliary monitoring unit with respect to the rate of changes. When the consumer is in the further operating state, the main monitoring unit is deactivated or operated in standby mode. When the consumer is in the further operating state, the main monitoring unit is activated, when the rate of changes in the current consumption reaches a threshold value and/or falls short of or exceeds a voltage range.

16 Claims, 2 Drawing Sheets

DEVICE AND METHOD FOR SAFETY SWITCH OFF OF AN ELECTRICAL CONSUMER IN A VEHICLE

CROSS REFERENCE TO RELATED APPLICATIONS

The present patent application claims the priority of European patent application 22 199 853.7 filed on Oct. 5, 2022, the contents of which are incorporated into the subject matter of the present application by reference in its entirety.

TECHNICAL FIELD

The disclosure relates to a device and a method for a safety switch off of an electrical consumer in a vehicle.

BACKGROUND

The electrical consumers of a vehicle are typically protected against excessive currents by fuses. While in past times safety fuses were used for that purpose, recently, there has been an increasing demand from vehicle manufacturers to replace safety fuses with electronic switches, i.e., transistors. For example, one advantage of such electronic switches is that this type of switch-off fuse can be used again even after a safety switch off of the consumer, and that much more detailed information on the condition of the electrical system of the vehicle, e.g., local current influences or node voltages, can be provided. Depending on the application, further applications of electronic switches as switch-off safety elements are conceivable.

With electronic switches for safety switch-off devices of electrical consumers in a vehicle, it is necessary to measure and to evaluate the present current consumption of the consumer, so as to be able to switch off the electronic switch in the event of a potential current or voltage overload. The circuits and circuit components necessary for this purpose require electrical energy for their operation.

To reduce the energy consumption of a vehicle, it is known to transfer electrical consumers that are not in permanent use into an idle or sleep state or into a standby state when they are not needed. In these two operating states, the current consumption of the electrical consumer is sometimes significantly lower than in its active state.

If the electrical consumer is not in its active state, the safety switch-off device should also operate in a current-saving mode. However, this is sometimes problematic, since the safety switch-off device is primarily designed for monitoring in the active state of the consumer and thus for a current consumption in the active state which is significantly higher compared to the idle or standby operating state, whereby it is consequently less sensitive to the comparatively low current consumptions in the idle or standby operating state of the consumer. Sometimes it may be the case that, without current-saving measures, the electronic safety switch-off device could require more energy than the consumer in its idle or standby operating state.

It is known from DE-A-10 2019 125 122 to monitor an electronic switch while using as little electric energy as possible, when a consumer connected to the line provided with the electronic switch is in an idle or standby operating mode.

DE A-10 2019 201 163 describes a protection device for switching off a battery cell of a battery system, in which the current consumption changes trigger the switch off of the battery cell.

SUMMARY

It is the object of the present disclosure to provide a device and a method for the safety switch off of an electrical consumer in a vehicle, wherein the current consumption monitoring in the operating states of the consumer, in which the current consumption is sometimes significantly lower than in its active state, is also designed to be current saving.

To achieve this object, the disclosure provides a safety switch-off device for an electrical consumer in a vehicle, the consumer being adapted to be operated, in an active state and in at least one further operating state, in an idle state with reduced current consumption compared to the active state, comprising:

an electronic switch with a current path, arranged in a supply line leading directly or indirectly to the at least one consumer of the vehicle, via which supply line the consumer can be supplied with the currents respectively necessary for operation in its active state and for operation in its at least one further operating state or in one of its further operating states;

a driver circuit for controlling the electronic switch, wherein either a switch-on signal for switching the electronic switch on and thus for switching its current path to a conducting state or a switch-off signal for switching the electronic switch off and thus for switching its current path to a blocking state can be applied to the driver circuit;

a voltage detection means provided in the supply line and generating a voltage drop when a current flows through the supply line;

at least one voltage amplifier with two inputs connected to the voltage detection means on either side of the same or to the supply line, and with an output supplying an amplified signal;

a high-pass or a band-pass filter for filtering the signal at the output of the voltage amplifier, comprising an input connected to the output of the voltage amplifier and comprising an output supplying the filtered signal;

a first comparator connected to the output of the high-pass or band-pass filter and comprising two inputs and one output, for comparing the magnitude of the output signal of the high-pass or band-pass filter to a first threshold value and/or to a first voltage range;

wherein the first comparator outputs a first activation signal at its output when the output signal of the high-pass or band-pass filter is greater than the first threshold value or equal to the first threshold value and/or exceeds or falls short of the first voltage range;

a monitoring unit connected to the output of the first comparator, which, whenever the at least one consumer is in its active state or in its at least one further operating state or in one of its further operating states, generates, for the driver circuit, the switch-on signal for the electronic switch to supply the at least one consumer with current and outputs to the driver circuit the switch-off signal for the electronic switch for the purpose of a potential safety switch off of the at least one consumer;

wherein the monitoring unit comprises switchable circuit components which can selectively be activated or deactivated, i.e., transferable into a switch-off mode or a standby mode, such as, for example, a logic circuit, an ADC for a voltage drop measurement with, e.g., determination of the thermal load of the supply line and/or the at least one consumer due to an increased current consumption and/or a temperature compensation circuit and/or a voltage supply circuit and/or a voltage regulation circuit and/or comparators with reference voltage generation circuits;

wherein the monitoring unit requires less electric energy when its switchable circuit components are deactivated than in the case where its switchable circuit components are activated, and wherein the switchable circuit components of the monitoring unit, when deactivated, are activatable upon receipt of the first activation signal present at the output of the first comparator.

Advantageous examples of the disclosure are the subject matter of the device sub-claims.

The safety switch-off device according to the disclosure comprises an electronic switch with a current path. The electronic switch is provided for arrangement in a supply line or is arranged in a supply line, which leads directly or indirectly to the (at least one) consumer of the vehicle (to be protected). The current path of the electronic switch, which typically is a transistor and in particular a MOS transistor or the like field-effect transistor, is switched on by a switch-on signal, i.e., switched to be conducting, and is switched off by a switch-off signal, i.e. switched to be blocking, which are received by a driver circuit controlling the electronic switch The supply line further includes a voltage detection means for the detection of a voltage drop when current flows through the supply line. The voltage drop across the voltage detection means, which according to the disclosure thus is provided for arrangement in said supply line, is amplified using a voltage amplifier which supplies the amplified (voltage drop) signal at its output. The output signal of the voltage amplifier or the (unamplified) voltage drop signal is supplied to a monitoring unit which, for example, checks the magnitude of the signal in order to generate a switch-off signal for the electronic switch in an emergency. The functionality of the monitoring unit is given, for example, when the electrical consumer is in its active state. If, however, the electrical consumer is in its idle or standby state, the monitoring unit can, according to the disclosure, be deactivated or significantly restricted in its functionality in order to reduce the demand for electrical energy when monitoring the current consumption of the electrical consumer in its idle or standby operating state. Insofar, the monitoring unit can be transferred from its active mode, in which it assumes the complete safety monitoring of the consumer or consumers, to a standby mode (or even almost switched-off mode) in which the supply of energy is reduced, in particular significantly reduced, and vice versa. Hereinabove and hereinafter, "deactive" or "deactivated", referring to the monitoring unit, thus means the standby or switched-off mode thereof, in which the monitoring unit is operated at low current consumption, possibly a current consumption near zero, by signals, internally stored states, the absence of clock signals, or by changing or disconnecting the supply voltage.

The state in which the consumer or consumers to which the supply line with the electrical switch and the voltage detection means leads, is or are in, is typically reported to the monitoring unit by a higher system level but may also be reported directly by the consumer or consumers.

According to the disclosure, the current consumption of the electrical consumer is monitored, particularly when it is in its idle or standby operating mode, with regard to the dynamic changes of its amplitude/magnitude. Such monitoring of the consumer by the monitoring unit in the deactivated state may, however, also be performed with the consumer in the active state, if advantageously only for a short time. In both cases the speed at which such changes occur is evaluated. DC components as well as offset influences and comparatively "slow" temperature-related influences on the output signal of the voltage amplifier are of no importance here. Compared with this, only higher frequency changes of the output signal of the voltage amplifier are considered, since such changes may be typical indicators for a change of the load state of the consumer or for the occurrence of short circuits. To this end, the output signal of the voltage amplifier is supplied to a high-pass or band-pass filter. According to the disclosure, the output signal of this filter is compared to a first threshold value in a (first) comparator. If the output signal of the high-pass or band-pass filter reaches or exceeds this first threshold value, the comparator generates a (first) activation signal which is supplied to the monitoring unit, whereupon the monitoring unit is transferred from its previously assumed standby mode to its monitoring mode so as to unfold its full functionality. The activation signal thus serves, so to speak, to "wake up" the monitoring unit. The circuit components which can be switched from "deactivated" to "activated", e.g., a logic circuit, an ADC for a voltage drop measurement with, e.g., determination of the thermal load of the supply line and/or the at least one consumer due to an increased current consumption and/or a temperature compensation circuit and/or a voltage supply circuit and/or a voltage regulation circuit and/or comparators with reference voltage generation circuits, are now "woken up," so that the monitoring unit is operated such that its circuit components provide for an absolute or integrative evaluation over time of currents and/or electrical powers and/or voltages on a line, which is generally known with electronic fuses that are intended to protect an active consumer against receiving overcurrent. However, according to the disclosure, only the deactivation of these circuit components is relevant in times in which, due to the current demand of the consumer being low anyway, as is the case, e.g., in its idle or standby operating state, such evaluations are not necessary to be able to activate the circuit components in a potential case of need. During this "wake-up process," the consumer may still be in its standby or idle state.

Reaching or exceeding the first threshold value of the first comparator is seen as an indication that the electrical consumer may have, for example, switched to its active state. In this state, the demands on the current consumption monitoring of the electrical consumer for the purpose of a potential safety switch off are significantly higher than in the case in which the consumer is in its idle or standby operating state. The extent to which the thus "awakened" monitoring unit remains in this state may be influenced by other, possibly higher-level checks of the state of the electrical consumer. Thus, if it is detected that the electrical consumer is still in the idle or standby operating state, the monitoring unit could be restored to its operation with reduced current consumption (standby mode) after a certain time, which is controlled by a higher-level system or according to a time condition or a similar state condition under control by the monitoring unit itself. As such, the monitoring unit could "wake up" under time control or according to another state condition to again assume its previous state of low current consumption if no increased current consumption by the consumer is detected for a predeterminable time of e.g. 0.1 sec, 1 sec or up to 10 secs (e.g. according to predeterminable criteria such as, for example, the detected current, the current course or the current profile).

As an alternative, the monitoring unit can be woken up cyclically, e.g., by a time condition. Further wake-up conditions may be linked to external circumstances. These external circumstances can also cause the monitoring unit to be woken up cyclically from time to time. This serves to check the correct functionality of the monitoring unit. Further, a possible voltage drop in the vehicle electric system could serve as a wake-up condition.

The above-described control of the device according to the disclosure can be stored preconfigured in a configuration memory, e.g., the monitoring unit. In particular, if the electronic switch is designed to protect the consumer against overcurrent, the higher-level system causes the monitoring unit to switch the electronic switch on again on a time-related basis or due to other specifications, which can be performed, for example, when the consumer, which also is switched off due to the switched-off electronic switch, is switched on again, i.e. assumes its active state or its idle or standby state again.

Accordingly, an advantage of the disclosure is that the required electrical energy for the current consumption monitoring is also reduced in the idle or standby state of the electrical consumer. However, a further advantage of the disclosure is to be seen primarily in the manner of evaluating the voltage drop across the voltage detection means when the consumer is in the idle or standby state. In this operating state, the amplitude of the relevant dynamic changes of the measured and amplified voltage drop across the voltage detection means is evaluated. DC components, such as static error contributions, are thus irrelevant. Advantageously, this type of monitoring automatically adapts to the present current consumption as a reference during the transition to the standby state. In other words, monitoring is not dependent on how high the current consumption actually is in the idle or standby operating state of the electrical consumer for (idle) currents of different sizes. Thus, no information is required in this respect, so that there is no need for the monitoring to be designed or defined in advance for currents of different sizes of electrical consumers in their idle or standby operating states.

In a further development of the disclosure, the first comparator may also check whether a voltage range is maintained or exceeded or fallen short of, for which purpose it is designed as a kind of window discriminator. It would thus be possible to check both polarities of dynamic changes as well as the exceeding of or falling below range limits. Thus, it would be possible to detect backward flowing currents, for example, which may occur in case of short circuits to other voltage supply sources or to other consumers. It would also be possible to make an "opening" of the load or the consumer detectable, if, for example, the current consumption falls from a DC level to zero.

In a further development of the disclosure, the safety switch-off device may comprise an emergency switch-off comparator connected to the output of the at least one voltage amplifier for comparing the absolute magnitude of the signal (including the DC components) at the output of the at least one voltage amplifier to an emergency switch-off threshold value, the emergency switch-off comparator generating a switch-off signal for the electronic switch, if the magnitude of the signal at the output of the at least one voltage amplifier reaches or exceeds the emergency switch-off threshold value. The measure according to this development of the disclosure serves to provide additional safety for a switch off of the electrical consumer in an emergency. If, excessive currents should occur in the idle or standby operating state of the consumer, which rise comparatively slowly, the emergency switch-off comparator can generate a switch-off signal for the electrical switch. This happens when the current consumption of the electrical consumer exceeds the emergency switch-off threshold. In this context, it is relevant that the response time for the emergency switch off is shorter than the above-described wake-up or initialization time of the monitoring unit. The emergency switch-off threshold can be set depending on the consumer or correspond to a threshold which serves for emergency switch off also in the active state of the consumer. The nominal power consumption of the electrical consumer in its active state is typically known. Thus, the emergency shut-off threshold should be set higher by a certain percentage value. This may be done automatically, for example, by detecting the current consumption of the electrical consumer during the transition from the active state to its idle or standby operating state and using the same as a basis for the value of the emergency switch-off threshold.

In the safety switch-off device according to the disclosure, it may further be provided that the monitoring unit is connected to the output of the at least one voltage amplifier and, when its switchable circuit components are activated, evaluates the signal at the output of the at least one voltage amplifier with respect to the selective generation of the switch-on signal and the switch-off signal for the electronic switch. This connection between the output of the voltage amplifier and the monitoring unit is used when the monitoring unit has assumed its full functionality and thus the monitoring mode after receipt of the first activation signal. Then, the monitoring unit operates based on the magnitude of the output signal of the voltage amplifier; the frequencies and the magnitude, i.e., the amplitude of dynamic changes of this output signal are then basically irrelevant according to the disclosure.

In a further example of the disclosure, it may be provided that the output of the high-pass or band-pass filter is connected to a second comparator for comparing the magnitude of the output signal of the high-pass or band-pass filter to a second threshold value higher than the first threshold value, the second comparator outputting a second activation signal, if the signal at the output of the high-pass or band-pass filter is larger than the second threshold value or equal to the second threshold value, wherein the second activation signal can be supplied to the monitoring unit for the activation of its switchable circuit components for the purpose of further treatment and processing for a possible conversion into a switch-off signal for the electronic switch and/or is designed as a switch-off signal for the electronic switch. Here, the output signal of the high-pass or band-pass filter is thus compared to a second threshold value that is higher than or equal to the first threshold value. Should the rate of change (i.e., the amplitude of the dynamic changes) of the current consumption of the electrical consumer be very high in the idle or standby operating state, this may be an indication of a short circuit or another hazardous condition. This is then prevented by switching the electronic switch off, if necessary.

The above-described emergency switch-off comparator and the second comparator provided according to the above-described example of the disclosure could thus certainly lead to the same result, i.e., the switching off of the electronic switch. While this event is induced by the emergency switch-off comparator due to the magnitude of the amplified output signal of the voltage amplifier, it occurs by means of the second comparator due to the dynamics, i.e., the speed of the current consumption change of the electrical consumer in the idle or standby operating state thereof.

In a further suitable example of the disclosure, a single voltage amplifier may be provided, which can be switched between an operation with a higher energy demand and an operation with a lower energy demand, i.e. which can be switched, for example, for operation with the at least one consumer in the active state and with the consumer in its at least one further operating state or in one of its further operating states. The switching is affected under control by the monitoring unit. Thus, also the voltage amplifier can be configured to be switchable, in order to adapt the requirements for the accuracy of the voltage amplification and the sensitivity of the voltage amplifier to whether the monitoring unit is in the monitoring mode or in the standby mode or whether the electrical consumer is in its active state or in one of its other operating states with reduced current consumption. For example, in the standby mode of the monitoring unit, the amplification factor could be changed, typically could be increased, and/or the band width of the voltage amplifier could be reduced to a level which is aligned to the bandwidth of the high-pass or band-pass filter and is thus generally slower than in the potentially safety-relevant active operation of the consumer. Advantageously, a DC decoupling would reduce the requirements regarding the accuracy of the voltage amplification. Since higher safety levels are often required in a vehicle in the drive mode than in the switch-off mode or the standby mode, there can be allowable sacrifices with regard to the level of safety checks.

According to an example of the disclosure, the safety switch-off device can comprise a single voltage amplifier, wherein either the voltage amplifier has a variable amplification factor controlled e.g. by the monitoring unit, which is higher when circuit components of the monitoring unit are deactivated than when circuit components of the monitoring unit are activated, or the high-pass or band-pass filter comprises a voltage amplifier connectable when circuit components of the monitoring unit are deactivated, for outputting an output signal amplified even further and thus higher as compared to the amplification by the voltage amplifier.

As an alternative to the above, a first voltage amplifier and a second voltage amplifier can be provided, the first voltage amplifier being adapted to be operated when the circuit components of the monitoring unit are deactivated, thus for example with at least one consumer in its at least one further operating state or with at least one consumer in one of its further operating states, or in other words with the monitoring unit in the standby mode, and the second voltage amplifier being operable with activated circuit components of the monitoring unit (i.e. in its monitoring mode) and thus for example with at least one consumer in the active state, the high-pass or band-pass filter being connected to the output of the first voltage amplifier. Thus, the first voltage amplifier should be better suited for processing low voltage drops across the voltage detection means, for example, in the idle or standby operating state of the consumer, while accepting a lower bandwidth, accuracy and safety monitoring test, etc.

In an example of this further alternative of the disclosure, it may be provided that a first voltage amplifier with a first amplification factor and a second voltage amplifier with a second amplification factor smaller than the first amplification factor, of which the first voltage amplifier is operable with the circuit components of the monitoring unit deactivated, and the second voltage amplifier is operable with the circuit components of the monitoring unit activated, and that the high-pass or band-pass filter is connected to the output of the first voltage amplifier.

As already mentioned above, a voltage detection means is arranged in the supply line. In this context, the voltage detection means can be a voltage detection element or elements. The voltage detection element or elements may be a shunt resistor and/or the current path of the electronic switch. The current path of the electronic switch has an extremely low resistance in the switched-on state, which is also desirable with regard to minimizing power losses. The shunt resistor provided as an alternative to the electronic switch should also be comparatively small. Therefore, in both cases, the demands on the voltage amplifier are increased, in particular when the consumer has a reduced current consumption. If, on the other hand, a comparatively large current flows, as is typically given in the active state of the consumer, the voltage drop is comparatively large as well, so that its evaluation with regard to a potential safety switch off of the consumer in the active state is less critical than in the case in which the consumer is in the idle or standby operating state.

According to the disclosure, the above-mentioned object is also achieved by a method for the safety switch off of an electrical consumer in a vehicle, which is connected directly or indirectly to a supply line provided with an electronic switch, in which method:

by a main monitoring unit, the operation of which is switchable from a monitoring mode to a standby mode and vice versa, the current consumption of the consumer is monitored in its monitoring mode with respect to a safety switch-off threshold which, when reached or exceeded, results in the generation of a switch-off signal for switching off the electronic switch by the main monitoring unit;

the main monitoring unit is switched from the standby mode to the monitoring mode, when the amplitude of the dynamic changes in the current consumption of the consumer reaches or exceeds a first threshold value and/or falls below or exceeds a first value range and/or a voltage value proportional to the first threshold value or a voltage range proportional to the first value range; and the current consumption of the consumer is monitored in the standby mode of the main monitoring unit by an auxiliary monitoring unit with regard to the amplitude of a potential dynamic change and triggering the switch over of the main monitoring unit from the standby mode to the monitoring mode when the first threshold value is reached or exceeded and/or the first value range and/or the voltage value proportional to the first threshold value or the voltage range proportional to the first value range is fallen below and/or exceeded.

The main monitoring unit is the monitoring unit described and discussed above in connection with the safety switch-off device of the disclosure. The auxiliary monitoring unit substantially comprises the features of the high-pass and band-pass filter and the first and second comparators, respectively, described above in connection with the safety switch-off device of the disclosure.

In a further example of the method according to the disclosure, it may be provided that, with the main monitoring unit in the standby mode, a switch-off signal for switching off the electronic switch is generated when the amplitude of the dynamic changes in the current consumption of the consumer reaches or exceeds a second threshold value which is greater than the first threshold value.

Finally, in a further example of the method according to the disclosure, it can be provided that, when the main monitoring unit is in the standby mode, the magnitude of the signal of a voltage detection means arranged in the supply line is compared with an emergency switch-off threshold, which, when reached or exceeded, generates a switch-off signal for switching off the electronic switch.

The triggering of the transition of the operation of the monitoring unit or the main monitoring unit from its monitoring mode to its standby mode may be affected externally. Such a transition may be triggered, for example, when the consumer is transferred to or by the consumer being transferred to its idle or standby mode, which may depend on the present driving operation and the requirements of the driving operation. Other moments triggering the transition may result from the evaluation of the vehicle state as a whole (driving operation, standing). The individual events leading to such a switching of the operation of the monitoring unit or the main monitoring unit are manifold and application-dependent and shall not be addressed in detail here. The disclosure has as its object to "wake up" the monitoring unit or the main monitoring unit when needed, in order to prophylactically unfold its full functionality, when it has to fulfill fewer requirements and is therefore in a standby mode.

BRIEF DESCRIPTION OF THE DRAWINGS

The disclosure is explained in more detail below by means of two examples and with reference to the drawings. In the Figures.

DESCRIPTION

Figure 1:
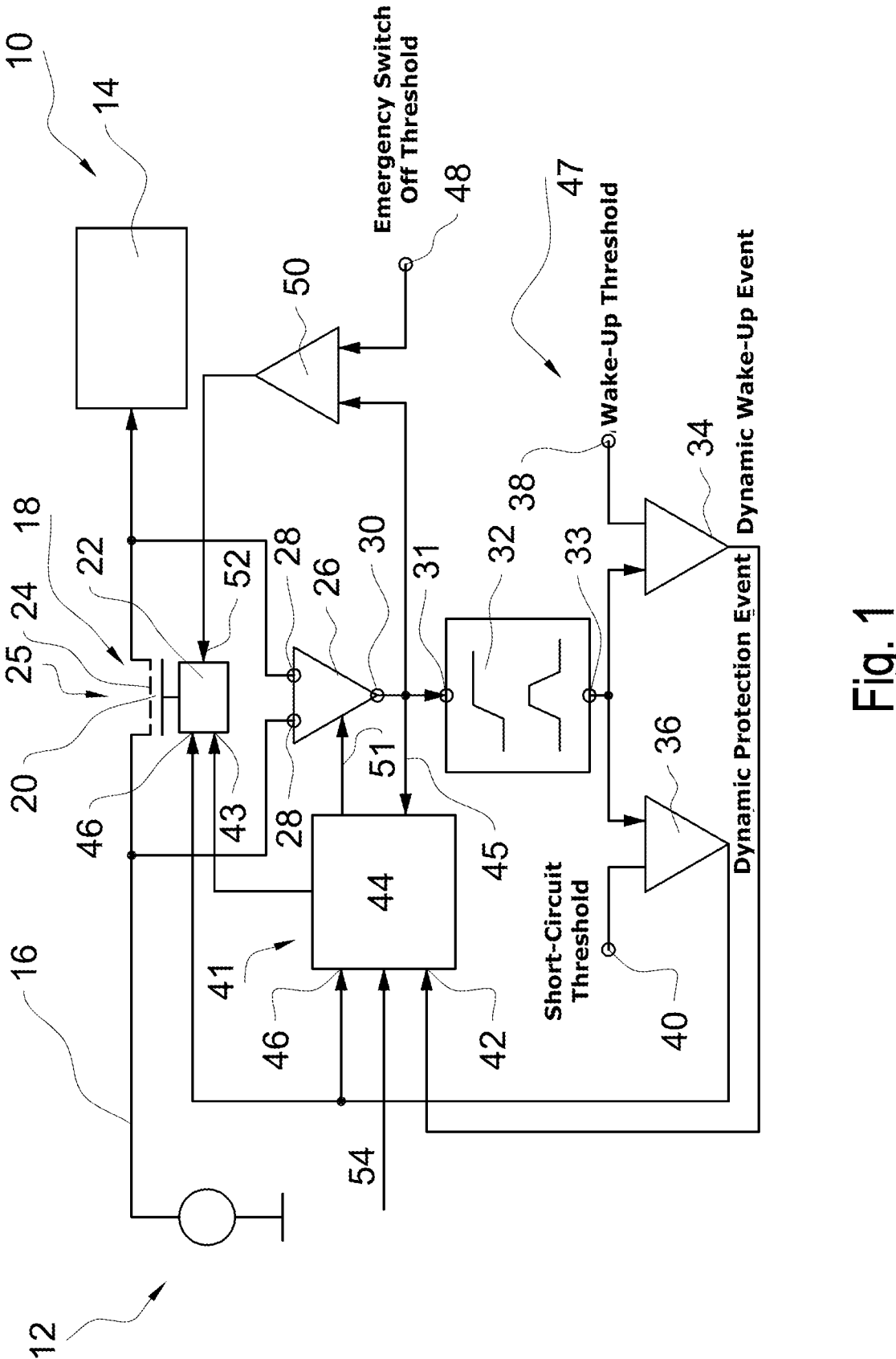
FIG. 1 shows a block diagram of a first example of the disclosure.

FIG. 1 shows a block diagram of a first example of a safety switch-off device 10. An energy source 12, for example the electrical system of a vehicle, supplies electric energy to a consumer 14. In the supply line 16 leading to the consumer 14 an electronic switch 18 is arranged, in this example in the form of a MOS transistor 20, which is controlled by a driver 22.

When the consumer 14 is in its idle or standby state, its current consumption is significantly reduced compared to that in its active state. In this example, the current path 24 of the electronic switch 18 is used as a shunt for the detection of a voltage drop, i.e. as a voltage detection means 25. A voltage amplifier 26 is connected to the supply line 16 by its two inputs 28 on either side of the electronic switch 18. The amplified input signal is then present at the output 30 of the voltage amplifier 26. It should be noted that the input signal is significantly smaller when the consumer 14 is in its idle or standby operating state than when the consumer 14 is in its active state. Offset and DC influences therefore have a disproportionate effect on the output signal of the voltage amplifier 26.

In this context, it is advantageous that the magnitude of the DC component of the output signal of the voltage amplifier 26 has no effect on the current consumption monitoring in the idle or standby operating state of the consumer 14. Rather, the amplitudes of dynamic changes in the output signal of the voltage amplifier 26 are examined in order to induce a switch off of the electronic switch 18 if necessary.

For this purpose, the output signal of the voltage amplifier 26 is fed to the input 31 of a high-pass or band-pass filter 32 with an output 33. With this filter 32, DC components and offset influences on the amplified output signal of the voltage amplifier 26 are not taken into account. Also, comparatively "slow" voltage changes due to temperature influences or due to aging effects are "filtered out", as it were. Changes of the output signal of the voltage amplifier 26 with frequencies which are above the base frequency of the high-pass filter or the lower base frequency of the band-pass filter pass this filter and are examined for reaching or exceeding two thresholds, namely a (first) wake-up threshold 38 and a (second) short-circuit threshold 40 which is larger than the former. A first comparator 34 and a second comparator 36 are used for this purpose. The first comparator 34 compares the signal at the output 33 of the high-pass or band-pass filter 32 with the wake-up threshold 38, while the second comparator 36 compares the output signal of the filter 32 with the short-circuit threshold 40.

The first comparator 34 outputs an activation signal 42 when the output signal of the high-pass or band-pass filter 32 exceeds the wake-up threshold 38. This activation signal 42 is fed to a monitoring unit 44, which performs current monitoring in the active state of the consumer 14 with regard to a potentially required safety shutdown (operation in monitoring mode). In this respect, the monitoring unit 44 can also be seen as the main monitoring unit 41. In the idle or sleep operating state of the consumer 14, this monitoring unit 44 is in a standby mode with limited functionality, whereby in this state the electrical energy required by the monitoring unit 44 is significantly less than in the case of full functionality. The first activation signal 42 thus "wakes up" the monitoring unit 44, as it were.

Thus, after the monitoring unit 44 has transitioned from the standby mode to the monitoring mode, it could now, for example, in case of need, supply the driver 22 with a switch-off signal for switching off the electronic switch 18. In its standby mode, it first supplies the driver 22 with a switch-on signal for switching on and maintaining the switch-on state of the electronic switch 18. After having received the activation signal 42, the monitoring unit 44 checks, for example, on the basis of the magnitude of the output signal of the voltage amplifier 26 (see the connection line 45) and possibly on the basis of other information from other, higher-level system components of the vehicle, whether a safety switch off of the electrical consumer 14 is required. If necessary, it outputs a switch-off signal 43 to the driver 22. If there are no further indications of a safety switch off, the monitoring unit 44 will typically automatically return to its standby mode after a certain time.

Should the output signal of the high-pass or band-pass filter 32 be greater than the short-circuit threshold 40, then an emergency switch-off signal 46 is generated by the comparator 36 (in addition to the activation signal 42), which can also be fed directly to the monitoring unit 44 as a logic signal and also directly to the driver 22. Thus, in the event that the output signal of the high-pass or band-pass filter 32 moves in magnitudes that indicate, for example, a potential short circuit of the electrical consumer 14 or some other hazardous situation, an emergency switch off can be performed.

As described above, the monitoring the current consumption of the electrical consumer 14, for example in its idle or standby operating mode, is based on an assessment of the frequency and the magnitude with which the output signal of the voltage amplifier 26 changes (amplitude of dynamic changes). In this respect, the high-pass or band-pass filter 32, the first comparator 34 and the second comparator 36, if present, can be seen as an auxiliary monitoring unit 47.

In the event that, for whatever reason, the output signal slowly rises to a critical level at which it is also suspected that a hazardous situation has occurred, the output signal of the voltage amplifier 26 is compared to an emergency switch-off threshold 48 by means of an emergency switch-off comparator 50. When this emergency switch-off comparator 50 responds, it generates an emergency switch-off signal 52 which is fed directly to the driver 22 of the electronic switch 18, thereby turning off the electronic switch 18.

The operation of the voltage amplifier 26 can be changed depending on the state of the safety switch-off device 10. In the standby mode of the monitoring unit 44, for example when the electrical consumer is in the idle or standby mode, the voltage amplifier 26 could be in a current saving mode, thus further reducing energy consumption. If the monitoring unit 44 unfolds its full functionality, i.e., for example, as a result of receiving the logic activation and emergency switch-off signals 42 and 46, it may "switch" the voltage amplifier 26 (see the select control line 51) so that it now amplifies the voltage applied to its input much more accurately and/or much faster or, more generally, with a substantially higher performance. This more accurate operation of the voltage amplifier 26 is needed in the following, since by "waking up" the monitoring unit 44, it must be assumed that the electrical consumer 14 has, for example, itself entered the active state, in which its current monitoring must be substantially more accurate than, for example, in the idle or standby operating state.

Figure 2:
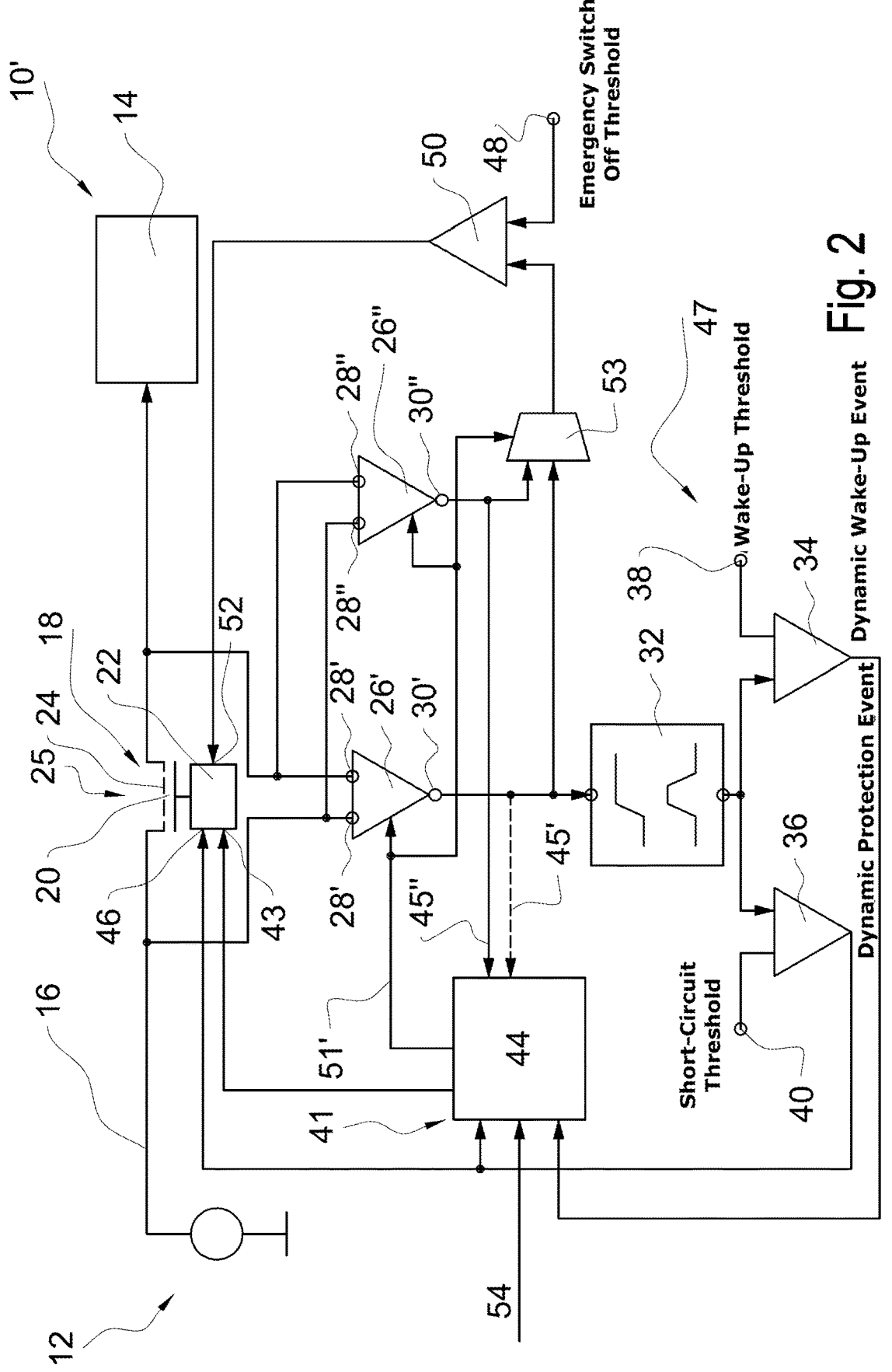
FIG. 2 shows a block diagram of a second example of the disclosure.

FIG. 2 shows a second example of the safety switch-off device 10'. In as far as the components shown in FIG. 2 are functionally identical or identical to those shown in the block diagram of FIG. 1, they are provided with the same reference numerals in FIG. 2 as in FIG. 1.

The difference between the two concepts of the safety switch-off device 10, 10' of FIGS. 1 and 2 is that in the block diagram of FIG. 2 two voltage amplifiers 26', 26'' are used, between which switching is performed under control by the monitoring unit 44. The voltage amplifier 26', for example, is used when current monitoring is performed when the monitoring unit 44 is in the standby mode, such as is the case, for example, when the consumer 14 is in the idle or standby operating state, while the voltage amplifier 26'' is used for current monitoring when the monitoring unit 44 is in the monitoring mode, such as, for example, when the consumer 14 is in the active state. Both are controlled by the monitoring unit 44 via the select control line 51'. The outputs 30', 30'' of the two voltage amplifiers 26', 26'' are now connected to the emergency switch-off comparator 50, if needed. For this purpose, a multiplex circuit 53 is used, for example, which is also controlled by the monitoring unit 44 via the select control line 51'. The output of the voltage amplifier 26'' is connected to the monitoring unit 44 (see the connection line 45''), since the monitoring unit 44 evaluates the magnitude of the output signal of the voltage amplifier 26'' for a potential safety switch off, when the monitoring unit 44 is in monitoring mode. An electrical connection can also be provided between the output of the voltage amplifier 26' and the monitoring unit 44 (indicated in FIG. 2 by dashed line 45').

In the Figures, the signal line 54 indicates that a signal can be applied to the monitoring unit 44 by a higher system level (not illustrated), which causes the electronic switch 18 to be switched on again, e.g., after the electronic switch 18 has been switched off (for whatever reason). Predefined reactions to be triggered by the monitoring unit 44 may also be stored in a configuration memory in the monitoring unit 44 or externally thereof. Generally, there is a variety of possibilities for the initialization of control signals for the monitoring unit which exist in addition to the controls of the monitoring unit provided according to the disclosure. These may come from a higher system level (see, e.g., control line 54) which demands the switching on or off of the supply line. This may be information preconfigured in the monitoring unit 44 or at another location, which information determines which state the outputs of the monitoring unit 44 have to assume in the case of certain events which ensue from inherent measuring means or the monitoring or a reset (e.g., upon an overload in the electronic switch 18, in the case of an undervoltage in the system or the electrical system of a vehicle, in the case of excessive temperatures e.g. of the consumer or the electronic switch or other components of the device according to the disclosure, etc.). Through this preconfiguration and the higher system level, switching state changes can of course be required or varied. Similarly, the monitoring unit can be "woken up" when it receives a signal from the higher system level that indicates that the consumer transitions from its idle or standby state to its active state, unless the device does not determine this from the "normal" current increase to be expected for such a transition.

The device according to the disclosure addresses the triggering of the activation of the monitoring unit 44, when the same is in its standby state due to the idle or standby state of the consumer 14 or due to other reasons as explained above.

According to examples and variants, the disclosure can also be defined in an advantageous manner by one or more of the features listed below:

1. A safety switch-off device for an electrical consumer in a vehicle, the consumer being adapted to be operated in an active state and in at least one further operating state in an idle state with reduced current consumption compared to the active state, comprising:

an electronic switch 18 with a current path 24 which can be switched on, i.e. be switched to be conducting, by a switch-on signal, and can be switched off, i.e. be switched to be blocking, by a switch-off signal, and which is arranged in a supply line 16 leading directly or indirectly to the at least one consumer 14 of the vehicle. via which supply line the consumer 14 can be supplied with the currents respectively necessary for operation in its active state and for operation in its at least one further operating state or in one of its further operating states, a voltage detection means 25 arranged in the supply line 16 and generating a voltage drop when a current flows through the supply line 16, at least one voltage amplifier 26, 26', 26'' with two inputs 28 connected on either side of the voltage detection means 25 to the latter or to the supply line 16, and with an output 30, 30', 30'' supplying an amplified signal, a high-pass or a band-pass filter 32 for filtering the signal at the output 30, 30', 30'' of the voltage amplifier 26, 26', 26'', comprising an input 31 connected to the output 30, 30', 30'' of the voltage amplifier 26, 26', 26'' and comprising an output 33 supplying the filtered signal, a first comparator 34 connected to the output 33 of the high-pass or band-pass filter 32 for comparing the magnitude of the output signal of the high-pass or band-pass filter 32 to a first threshold value 38 and/or to a first voltage range, wherein the first comparator 34 outputs a first activation signal 42 when the output of the high-pass or band-pass filter 32 is greater than the first threshold value 38 or equal to the first threshold value 38 and/or exceeds or falls below the first voltage range, monitoring unit 44 receiving the first activation signal 42 of the first comparator 34, which, whenever the at least one consumer 14 is in its active state or in its at least one further operating state or in one of its further operating states, generates the switch-on signal for the electronic switch 18 to supply the at least one consumer 14 with current and generates the switch-off signal for the electronic switch 18 for a safety switch off of the at least one consumer 14, wherein the monitoring unit 44 comprises switchable circuit components which can selectively be activated or deactivated, such as, for example, a logic circuit, an ADC for a voltage drop measurement with, e.g., determination of the thermal load of the supply line and/or the at least one consumer due to an increased current consumption and/or a temperature compensation circuit and/or a voltage supply circuit and/or a voltage regulation circuit and/or comparators with reference voltage generation circuits, wherein the monitoring unit 44 requires less electric energy when its switchable circuit components are deactivated than in the case where its switchable circuit components are activated, and wherein the switchable circuit components of the monitoring unit 44, when deactivated, are activatable upon receipt of the first activation signal 42.

2. The safety switch-off device according to item 1, characterized by an emergency switch-off comparator 50 connected to the output 30, 30', 30" of the at least one voltage amplifier 26, 26', 26" for comparing the magnitude of the signal at the output 30, 30', 30" of the at least one voltage amplifier 26, 26', 26" to an emergency switch-off threshold value 48, the emergency switch-off comparator 50 generating a switch-off signal 52 for the electronic switch 18, if the magnitude of the signal at the output 30, 30', 30" of the at least one voltage amplifier 26, 26', 26" reaches or exceeds the emergency switch-off threshold value 48.

3. The safety switch-off device according to items 1 or 2, characterized in that the monitoring unit 44 is connected to the output 30, 30', 30" of the at least one voltage amplifier 26, 26', 26" and, when its switchable circuit components are activated, evaluates the signal at the output 30, 30', 30" of the at least one voltage amplifier 26, 26', 26" with respect to the selective generation of the switch on signal and the switch-off signal for the electronic switch 18.

4. The safety switch-off device according to any one of items 1 to 3, characterized in that the output 33 of the high-pass or band-pass filter 32 is connected to a second comparator 36 for comparing the magnitude of the output signal of the high-pass or band-pass filter 32 to a second threshold value 40 higher than the first threshold value 38, the second comparator 36 outputting a second activation signal 46, if the signal at the output 33 of the high-pass or band-pass filter 32 is larger than the second threshold value 40 or equal to the second threshold value 40, the second activation signal 46 being adapted to be supplied to the monitoring unit 44 for the activation of its switchable circuit components for the purpose of further treatment and processing for a possible conversion into a switch-off signal 43 for the electronic switch 18 and/or being designed as a switch-off signal 46 for the electronic switch 18.

5. The safety switch-off device according to any one of items 1 to 4, characterized in that a single voltage amplifier 26 is provided, which can be switched between an operation with a higher energy demand and an operation with a lower energy demand, and that the voltage amplifier 26 needs less energy when the circuit components of the monitoring unit

44 are deactivated that when the circuit components of the monitoring unit 44 are activated, and that it is switchable under control by the monitoring unit 44.

6. The safety switch-off device according to any one of items 1 to 4, characterized in that a first voltage amplifier 26' and a second voltage amplifier 26" are provided, the first voltage amplifier being adapted to be operated when the circuit components of the monitoring unit 44 are deactivated, and the second voltage amplifier 26" being operable when the circuit components of the monitoring unit 44 are activated and that the high-pass or band-pass filter 32 is connected to the output 30 of the first voltage amplifier 26'.

7. The safety switch-off device according to item 6 and item 2 or item 3 or 4 as far as referred to item 2, characterized in that the outputs 30', 30" of both voltage amplifiers 26', 26" are connected to the emergency switch-off comparator 50 or that a respective one of these outputs 30', 30" can be connected to the emergency switch-off comparator 50.

8. The safety switch-off device according to item 6 and item 3 or item 4 as far as referred to item 3, characterized in that the monitoring unit 44 is connected to the output 30" of the second voltage amplifier 26".

9. The safety switch-off device according to any one of items 1 to 8, characterized in that the voltage detection means 25 is a shunt resistor or that the current path 24 of the electronic switch 18 serves as the voltage detection means 25.

10. A method for the safety switch off of an electrical consumer in a vehicle, which is connected directly or indirectly to a supply line provided with an electronic switch, in which method:

by a main monitoring unit 41, the operation of which is switchable from a monitoring mode to a standby mode and vice versa, the current consumption of the consumer 14 is monitored in the monitoring mode of the main monitoring unit with respect to a safety switch-off threshold which, when reached or exceeded, results in the generation of a switch-off signal 43 for switching off the electronic switch 18 by the main monitoring unit 41, the main monitoring unit 41 is switched from the standby mode to the monitoring mode when the amplitude of the dynamic changes of the current consumption of the consumer 14 reaches or exceeds a first threshold value 38 and/or falls short of or exceeds a first voltage range, and the current consumption of the consumer 14 in the standby mode of the main monitoring unit 41 is monitored by an auxiliary monitoring unit 47 with respect to the amplitude of a potential dynamic change, and which, when the first threshold value is reached or exceeded and/or when the first voltage range is fallen short of or exceeded, triggers the switching of the main monitoring unit 41 from the standby mode to the monitoring mode.

11. The method according to item 10, characterized in that, with the main monitoring unit 41 in the standby mode, a switch-off signal for switching off the electronic switch 18 is generated when the amplitude of the dynamic changes in the current consumption of the consumer 14 reaches or exceeds a second threshold value 40 which is greater than the first threshold value 38.

12. The method according to item 10 or 11, characterized in that, with the main monitoring unit 41 in the standby mode, the magnitude of the signal of a voltage detection means 25 arranged in the supply line 16 is compared with an emergency switch-off threshold value 48, a switch-off signal 52 for switching off the electronic switch 18 being generated when the emergency switch-off threshold value is reached or exceeded.

LIST OF REFERENCE NUMERALS

10 safety switch-off device
10' safety switch-off device
12 energy source (e.g. electrical system of the vehicle)
14 electrical consumer
16 supply line
18 electronic switch
20 MOS transistor
22 driver
24 current path
25 voltage detection means
26 voltage amplifier
26' first voltage amplifier
26" second voltage amplifier
28 inputs of the voltage amplifier
30 output of the voltage amplifier
30' output of the voltage amplifier
30" output of the voltage amplifier
31 input of the high-pass and band-pass filter
32 high-pass or band-pass filter
33 output of the high-pass or band-pass filter
34 first comparator
36 second comparator
38 wake-up threshold
40 short-circuit threshold
41 main monitoring unit
42 activation signal
43 switch-off signal
44 monitoring unit
45 connection line from the voltage amplifier to the monitoring unit
45' connection line from the voltage amplifier to the monitoring unit
46 emergency switch-off signal
47 auxiliary monitoring unit
48 emergency switch-off threshold
50 emergency switch-off comparator
51 select control line
51' select control line
52 emergency switch-off signal
53 multiplex circuit
54 signal line

What is claimed is:

1. A safety switch-off device for an electrical consumer in a vehicle, the electrical consumer being adapted to be operated in an active state and in at least one further operating state with reduced current consumption compared to the active state, the at least one further operating state being an idle or standby state, the device comprising:

an electronic switch with a current path, arranged in a supply line leading directly or indirectly to the at least one electrical consumer of the vehicle, via which supply line the electrical consumer can be supplied with currents respectively necessary for operation in its active state and for operation in its at least one further operating state or in one of its further operating states, a driver circuit for controlling the electronic switch, wherein either a switch on signal for switching the electronic switch on and thus for switching its current path to a conducting state or a switch-off signal for switching the electronic switch off and thus for switching its current path to a blocking state can be applied to the driver circuit, a voltage detection element provided for arrangement in the supply line and generating a voltage drop when a current flows through the supply line, at least one voltage amplifier with two inputs connected on either side of the voltage detection element, and with an output supplying an amplified signal, a high-pass or a band-pass filter for filtering the amplified signal at the output of the voltage amplifier, comprising an input connected to the output of the voltage amplifier and comprising an output supplying the filtered signal, a first comparator connected to the output of the high-pass or band-pass filter and comprising two inputs and one output, for comparing a magnitude of the filtered signal of the high-pass or band-pass filter to a first threshold value or to a first voltage range, wherein the first comparator outputs a first activation signal at its output when the output of the high-pass or band-pass filter is greater than the first threshold value or equal to the first threshold value and exceeds or falls below the first voltage range, a monitoring unit connected to the output of the first comparator, which, whenever the at least one electrical consumer is in its active state or in its at least one further operating state or in one of its further operating states, generates, for the driver circuit, the switch on signal for the electronic switch to supply the at least one electrical consumer with current and outputs to the driver circuit the switch-off signal for the electronic switch for purpose of a potential safety switch off of the at least one electrical consumer, wherein the monitoring unit comprises switchable circuit components which can selectively be activated or deactivated, i.e. can be transferred into a switch-off or a standby mode, based on a determination of a thermal load of the supply line and/or the at least one electrical consumer due to an increased current consumption, or a temperature compensation circuit, or a voltage supply circuit, or a voltage regulation circuit, or comparators with reference voltage generation circuits, wherein the monitoring unit requires less electric energy when its switchable circuit components are deactivated than in a case where its switchable circuit components are activated, wherein the switchable circuit components of the monitoring unit, when deactivated, are activatable upon receipt of the first activation signal present at the output of the first comparator, and, wherein the output of the high-pass filter or band-pass filter is connected to a second comparator for comparing the magnitude of the output signal of the high-pass or band-pass filter to a second threshold value higher than the first threshold value, the second comparator outputting a second activation signal, if the signal at the output of the high-pass or band-pass filter is larger than the second threshold value or equal to the second threshold value, the second activation signal being adapted to be supplied to the monitoring unit for the activation of its switchable circuit components for the purpose of further treatment and processing for a possible conversion into a switch-off signal for the electronic switch and/or being designed as a switch-off signal for the electronic switch.

2. The safety switch-off device according to claim 1, further comprising an emergency switch-off comparator connected to the output of the at least one voltage amplifier and comprising two inputs and one output, for comparing the magnitude of the signal at the output of the at least one voltage amplifier to an emergency switch-off threshold value, the emergency switch-off comparator outputting a switch off signal for the electronic switch at its output for the driver circuit, if the magnitude of the signal at the output of the at least one voltage amplifier reaches or exceeds the emergency switch-off threshold value.

3. The safety switch-off device according to claim 1, wherein the monitoring unit is connected to the output of the at least one voltage amplifier and, when its switchable circuit components are activated, evaluates the signal at the output of the at least one voltage amplifier with respect to the selective generation of a switch-on signal and the switch-off signal for the electronic switch.

4. The safety switch-off device according to claim 1, wherein the voltage detection element is a shunt resistor or that the current path of the electronic switch serves as the voltage detection element.

5. The safety switch-off device according to claim 1, wherein the switchable components include one or more of a logic circuit and an ADC.

6. A safety switch-off device for an electrical consumer in a vehicle, the electrical consumer being adapted to be operated in an active state and in at least one further operating state with reduced current consumption compared to the active state, the at least one further operating state being an idle or standby state, the device comprising:

an electronic switch with a current path, arranged in a supply line leading directly or indirectly to the at least one electrical consumer of the vehicle, via which supply line the electrical consumer can be supplied with currents respectively necessary for operation in its active state and for operation in its at least one further operating state or in one of its further operating states, a driver circuit for controlling the electronic switch, wherein either a switch on signal for switching the electronic switch on and thus for switching its current path to a conducting state or a switch-off signal for switching the electronic switch off and thus for switching its current path to a blocking state can be applied to the driver circuit, a voltage detection element provided for arrangement in the supply line and generating a voltage drop when a current flows through the supply line, at least one voltage amplifier with two inputs connected on either side of the voltage detection element, and with an output supplying an amplified signal, a high-pass or a band-pass filter for filtering the amplified signal at the output of the voltage amplifier, comprising an input connected to the output of the voltage amplifier and comprising an output supplying the filtered signal, a first comparator connected to the output of the high-pass or band-pass filter and comprising two inputs and one output, for comparing a magnitude of the filtered signal of the high-pass or band-pass filter to a first threshold value or to a first voltage range, wherein the first comparator outputs a first activation signal at its output when the output of the high-pass or band-pass filter is greater than the first threshold value or equal to the first threshold value and exceeds or falls below the first voltage range, a monitoring unit connected to the output of the first comparator, which, whenever the at least one electrical consumer is in its active state or in its at least one further operating state or in one of its further operating states, generates, for the driver circuit, the switch on signal for the electronic switch to supply the at least one electrical consumer with current and outputs to the driver circuit the switch-off signal for the electronic switch for purpose of a potential safety switch off of the at least one electrical consumer, wherein the monitoring unit comprises switchable circuit components which can selectively be activated or deactivated, i.e. can be transferred into a switch-off or a standby mode, based on a determination of a thermal load of the supply line or the at least one electrical consumer due to an increased current consumption, or a temperature compensation circuit, or a voltage supply circuit, or a voltage regulation circuit, or comparators with reference voltage generation circuits, wherein the monitoring unit requires less electric energy when its switchable circuit components are deactivated than in a case where its switchable circuit components are activated, wherein the switchable circuit components of the monitoring unit, when deactivated, are activatable upon receipt of the first activation signal present at the output of the first comparator, and wherein a single voltage amplifier is provided, which can be switched between an operation with a higher energy demand and an operation with a lower energy demand, and that the voltage amplifier needs less energy when the circuit components of the monitoring unit are deactivated than when the circuit components of the monitoring unit are activated, and that the voltage amplifier is switchable under control by the monitoring unit.

7. A safety switch-off device for an electrical consumer in a vehicle, the electrical consumer being adapted to be operated in an active state and in at least one further operating state with reduced current consumption compared to the active state, the at least one further operating state being an idle or standby state, the device comprising:

an electronic switch with a current path, arranged in a supply line leading directly or indirectly to the at least one electrical consumer of the vehicle, via which supply line the electrical consumer can be supplied with currents respectively necessary for operation in its active state and for operation in its at least one further operating state or in one of its further operating states, a driver circuit for controlling the electronic switch, wherein either a switch on signal for-switching the electronic switch on and thus for switching its current path to a conducting state or a switch-off signal for switching the electronic switch off and thus for switching its current path to a blocking state can be applied to the driver circuit, a voltage detection element provided for arrangement in the supply line and generating a voltage drop when a current flows through the supply line, at least one voltage amplifier with two inputs connected on either side of the voltage detection element, and with an output supplying an amplified signal, a high-pass or a band-pass filter for filtering the amplified signal at the output of the voltage amplifier, comprising an input connected to the output of the voltage amplifier and comprising an output supplying the filtered signal, a first comparator connected to the output of the high-pass or band-pass filter and comprising two inputs and one output, for comparing a magnitude of the filtered signal of the high-pass or band-pass filter to a first threshold value or to a first voltage range, wherein the first comparator outputs a first activation signal at its output when the output of the high-pass or band-pass filter is greater than the first threshold value or equal to the first threshold value and exceeds or falls below the first voltage range, a monitoring unit connected to the output of the first comparator, which, whenever the at least one electrical consumer is in its active state or in its at least one further operating state or in one of its further operating states, generates, for the driver circuit, the switch on signal for the electronic switch to supply the at least one electrical consumer with current and outputs to the driver circuit the switch-off signal for the electronic switch for purpose of a potential safety switch off of the at least one electrical consumer, wherein the monitoring unit comprises switchable circuit components which can selectively be activated or deactivated, i.e. can be transferred into a switch-off or a standby mode, based on a determination of a thermal load of the supply line or the at least one electrical consumer due to an increased current consumption, or a temperature compensation circuit, or a voltage supply circuit, or a voltage regulation circuit, or comparators with reference voltage generation circuits, wherein the monitoring unit requires less electric energy when its switchable circuit components are deactivated than in a case where its switchable circuit components are activated, wherein the switchable circuit components of the monitoring unit, when deactivated, are activatable upon receipt of the first activation signal present at the output of the first comparator, and the safety switch-off device further comprising a single voltage amplifier, wherein either the voltage amplifier has a variable amplification factor, which is higher when circuit components of the monitoring unit are deactivated than when circuit components of the monitoring unit are activated, or the high-pass or band-pass filter comprises a voltage amplifier connectable when circuit components of the monitoring unit are deactivated, for outputting an output signal amplified even further and thus higher as compared to the amplification by the voltage amplifier.

8. A safety switch-off device for an electrical consumer in a vehicle, the electrical consumer being adapted to be operated in an active state and in at least one further operating state with reduced current consumption compared to the active state, the at least one further operating state being an idle or standby state, the device comprising:

an electronic switch with a current path, arranged in a supply line leading directly or indirectly to the at least one electrical consumer of the vehicle, via which supply line the electrical consumer can be supplied with currents respectively necessary for operation in its active state and for operation in its at least one further operating state or in one of its further operating states, a driver circuit for controlling the electronic switch, wherein either a switch on signal for switching the electronic switch on and thus for switching its current path to a conducting state or a switch-off signal for switching the electronic switch off and thus for switching its current path to a blocking state can be applied to the driver circuit, a voltage detection element provided for arrangement in the supply line and generating a voltage drop when a current flows through the supply line, at least one voltage amplifier with two inputs connected on either side of the voltage detection element, and with an output supplying an amplified signal, a high-pass or a band-pass filter for filtering the amplified signal at the output of the voltage amplifier, comprising an input connected to the output of the voltage amplifier and comprising an output supplying the filtered signal, a first comparator connected to the output of the high-pass or band-pass filter and comprising two inputs and one output, for comparing a magnitude of the filtered signal of the high-pass or band-pass filter to a first threshold value or to a first voltage range, wherein the first comparator outputs a first activation signal at its output when the output of the high-pass or band-pass filter is greater than the first threshold value or equal to the first threshold value and exceeds or falls below the first voltage range, a monitoring unit connected to the output of the first comparator, which, whenever the at least one electrical consumer is in its active state or in its at least one further operating state or in one of its further operating states, generates, for the driver circuit, the switch on signal for the electronic switch to supply the at least one electrical consumer with current and outputs to the driver circuit the switch-off signal for the electronic switch for purpose of a potential safety switch off of the at least one electrical consumer, wherein the monitoring unit comprises switchable circuit components which can selectively be activated or deactivated, i.e. can be transferred into a switch-off or a standby mode, based on a determination of a thermal load of the supply line or the at least one electrical consumer due to an increased current consumption, or a temperature compensation circuit, or a voltage supply circuit, or a voltage regulation circuit, or comparators with reference voltage generation circuits, wherein the monitoring unit requires less electric energy when its switchable circuit components are deactivated than in a case where its switchable circuit components are activated, wherein the switchable circuit components of the monitoring unit, when deactivated, are activatable upon receipt of the first activation signal present at the output of the first comparator and wherein a first voltage amplifier and a second voltage amplifier are provided, the first voltage amplifier being adapted to be operated when the circuit components of the monitoring unit are deactivated, and the second voltage amplifier being operable when the circuit components of the monitoring unit are activated and that the high-pass or band-pass filter is connected to the output of the first voltage amplifier.

9. The safety switch-off device according to claim 8, further comprising an emergency switch-off comparator connected to the output of the at least one voltage amplifier and comprising two inputs and one output, for comparing a magnitude of the signal at the output of the at least one voltage amplifier to an emergency switch-off threshold value, the emergency switch-off comparator outputting a switch-off signal for the electronic switch at its output for the driver circuit, when the magnitude of the signal at the output of the at least one voltage amplifier reaches or exceeds the emergency switch-off threshold value, wherein the outputs of both the first and second amplifiers are connected respectively to one of the inputs of the emergency switch off comparator or that a respective one of the outputs of the first and second voltage amplifiers can be selectively connected to one of the inputs of the emergency switch-off comparator.

10. The safety switch-off device according to claim 8, further comprising an emergency switch-off comparator connected to the output of the at least one voltage amplifier and comprising two inputs and one output, for comparing a magnitude of the signal at the output of the at least one voltage amplifier to an emergency switch-off threshold value, the emergency switch-off comparator outputting a switch-off signal for the electronic switch at its output for the driver circuit, when the magnitude of the signal at the output of the at least one voltage amplifier reaches or exceeds the emergency switch-off threshold value, wherein the output of the high-pass or band-pass filter is connected to a second comparator for comparing a magnitude of the output signal of the high-pass or band-pass filter to a second threshold value higher than the first threshold value, the second comparator outputting a second activation signal, when the signal at the output of the high-pass or band-pass filter is larger than the second threshold value or equal to the second threshold value, the second activation signal being adapted to be supplied to the monitoring unit for the activation of its switchable circuit components for the purpose of further treatment and processing for a possible conversion into a switch-off signal for the electronic switch and/or being designed as a switch-off signal for the electronic switch, wherein the outputs of both the first and second amplifiers are connected respectively to one of the inputs of an emergency switch-off comparator or that a respective one of the outputs of the first and second voltage amplifiers can be selectively connected to one of the inputs of the emergency switch-off comparator.

11. The safety switch-off device according to claim 8, wherein the monitoring unit is connected to the output of the at least one voltage amplifier and, when its switchable circuit components are activated, evaluates the signal at the output of the at least one voltage amplifier with respect to the selective generation of a switch-on signal and the switch-off signal for the electronic switch, and further wherein the monitoring unit is connected to the output of the second voltage amplifier.

12. A safety switch-off device for an electrical consumer in a vehicle, the electrical consumer being adapted to be operated in an active state and in at least one further operating state with reduced current consumption compared to the active state, the at least one further operating state being an idle or standby state, the device comprising:

an electronic switch with a current path, arranged in a supply line leading directly or indirectly to the at least one electrical consumer of the vehicle, via which supply line the electrical consumer can be supplied with currents respectively necessary for operation in its active state and for operation in its at least one further operating state or in one of its further operating states, a driver circuit for controlling the electronic switch, wherein either a switch on signal for switching the electronic switch on and thus for switching its current path to a conducting state or a switch-off signal for switching the electronic switch off and thus for switching its current path to a blocking state can be applied to the driver circuit, a voltage detection element provided for arrangement in the supply line and generating a voltage drop when a current flows through the supply line, at least one voltage amplifier with two inputs connected on either side of the voltage detection element, and with an output supplying an amplified signal, a high-pass or a band-pass filter for filtering the amplified signal at the output of the voltage amplifier, comprising an input connected to the output of the voltage amplifier and comprising an output supplying the filtered signal, a first comparator connected to the output of the high-pass or band-pass filter and comprising two inputs and one output, for comparing a magnitude of the filtered signal of the high-pass or band-pass filter to a first threshold value or to a first voltage range, wherein the first comparator outputs a first activation signal at its output when the output of the high-pass or band-pass filter is greater than the first threshold value or equal to the first threshold value and exceeds or falls below the first voltage range, a monitoring unit connected to the output of the first comparator, which, whenever the at least one electrical consumer is in its active state or in its at least one further operating state or in one of its further operating states, generates, for the driver circuit, the switch on signal for the electronic switch to supply the at least one electrical consumer with current and outputs to the driver circuit the switch-off signal for the electronic switch for purpose of a potential safety switch off of the at least one electrical consumer, wherein the monitoring unit comprises switchable circuit components which can selectively be activated or deactivated, i.e. can be transferred into a switch-off or a standby mode, based on a determination of a thermal load of the supply line or the at least one electrical consumer due to an increased current consumption, or a temperature compensation circuit, or a voltage supply circuit, or a voltage regulation circuit, or comparators with reference voltage generation circuits, wherein the monitoring unit requires less electric energy when its switchable circuit components are deactivated than in a case where its switchable circuit components are activated, wherein the switchable circuit components of the monitoring unit, when deactivated, are activatable upon receipt of the first activation signal present at the output of the first comparator, and wherein a first voltage amplifier with a first amplification factor and a second voltage amplifier with a second amplification factor smaller than the first amplification factor are provided, of which the first voltage amplifier is operable with the circuit components of the monitoring unit deactivated, and the second voltage amplifier is operable with the circuit components of the monitoring unit activated, and that the high-pass or band-pass filter is connected to the output of the first voltage amplifier.

13. The safety switch-off device according to claim 12, further comprising an emergency switch-off comparator connected to the output of the at least one voltage amplifier and comprising two inputs and one output, for comparing a magnitude of the signal at the output of the at least one voltage amplifier to an emergency switch-off threshold value, the emergency switch-off comparator outputting a switch-off signal for the electronic switch at its output for the driver circuit, when the magnitude of the signal at the output of the at least one voltage amplifier reaches or exceeds the emergency switch-off threshold value, wherein the outputs of both the first and second amplifiers are connected respectively to one of the inputs of the emergency switch off comparator or that a respective one of the outputs of the first and second voltage amplifiers can be selectively connected to one of the inputs of the emergency switch-off comparator.

14. The safety switch-off device according to claim 12, further comprising an emergency switch-off comparator connected to the output of the at least one voltage amplifier and comprising two inputs and one output, for comparing a magnitude of the signal at the output of the at least one voltage amplifier to an emergency switch-off threshold value, the emergency switch-off comparator outputting a switch-off signal for the electronic switch at its output for the driver circuit, when the magnitude of the signal at the output of the at least one voltage amplifier reaches or exceeds the emergency switch-off threshold value, wherein the output of the high-pass or band-pass filter is connected to a second comparator for comparing a magnitude of the output signal of the high-pass or band-pass filter to a second threshold value higher than the first threshold value, the second comparator outputting a second activation signal, when the signal at the output of the high-pass or band-pass filter is larger than the second threshold value or equal to the second threshold value, the second activation signal being adapted to be supplied to the monitoring unit for the activation of its switchable circuit components for the purpose of further treatment and processing for a possible conversion into a switch-off signal for the electronic switch and/or being designed as a switch-off signal for the electronic switch, and further wherein the outputs of both the first and second amplifiers are connected respectively to one of the inputs of an emergency switch off comparator or that a respective one of the outputs of the first and second voltage amplifiers can be selectively connected to one of the inputs of the emergency switch-off comparator.

15. The safety switch-off device according to claim 12, wherein the monitoring unit is connected to the output of the at least one voltage amplifier and, when its switchable circuit components are activated, evaluates the signal at the output of the at least one voltage amplifier with respect to the selective generation of a switch-on signal and the switch-off signal for the electronic switch, further wherein the monitoring unit is connected to the output of the at least one voltage amplifier and, when its switchable circuit components are activated, evaluates the signal at the output of the at least one voltage amplifier with respect to the selective generation of a switch-on signal and the switch-off signal for the electronic switch, and further wherein the monitoring unit is connected to the output of the second voltage amplifier.

16. The safety switch-off device according to claim 12, wherein the output of the high-pass or band-pass filter is connected to a second comparator for comparing a magnitude of the output signal of the high-pass or band-pass filter to a second threshold value higher than the first threshold value, the second comparator outputting a second activation signal, when the signal at the output of the high-pass or band-pass filter is larger than the second threshold value or equal to the second threshold value, the second activation signal being adapted to be supplied to the monitoring unit for the activation of its switchable circuit components for the purpose of further treatment and processing for a possible conversion into a switch-off signal for the electronic switch and/or being designed as a switch-off signal for the electronic switch, and further wherein the monitoring unit is connected to the output of the second voltage amplifier.

* * * * *